United States Patent
Lee

(10) Patent No.: US 6,900,801 B2
(45) Date of Patent: May 31, 2005

(54) APPARATUS AND METHOD FOR DETECTING AN EDGE OF THREE-DIMENSIONAL IMAGE DATA

(75) Inventor: Jae-chool Lee, Busan (KR)

(73) Assignee: Samsung Electronics Co., LTD, Suwon-si (KR)

( * ) Notice: Subject to any disclaimer, the term of this patent is extended or adjusted under 35 U.S.C. 154(b) by 287 days.

(21) Appl. No.: 10/197,866

(22) Filed: Jul. 19, 2002

(65) Prior Publication Data

US 2003/0076317 A1 Apr. 24, 2003

(30) Foreign Application Priority Data

Oct. 19, 2001 (KR) ........................................ 2001-64546

(51) Int. Cl.⁷ ............................................. G06T 15/00
(52) U.S. Cl. ...................................... 345/419; 382/199
(58) Field of Search ................................ 345/419, 428, 345/581, 589, 619; 382/165, 197, 199, 203, 218, 264, 266

(56) References Cited

U.S. PATENT DOCUMENTS

| | | | |
|---|---|---|---|
| 4,499,383 A | * 2/1985 | Loose | 250/559.36 |
| 4,499,598 A | * 2/1985 | Chittineni | 382/266 |
| 5,081,689 A | * 1/1992 | Meyer et al. | 382/199 |
| 5,214,294 A | * 5/1993 | Toyofuku | 250/559.05 |
| 5,619,242 A | * 4/1997 | Haneda et al. | 347/131 |

OTHER PUBLICATIONS

Peli, Feature Detection Algorithm Based on a Visual System Model, Jan. 2002, IEEE, vol. 90, No. 1, pp. 78–93.*
Martelli, An Application of Heuristic Search and Methods to Adge and Contour Detection, Feb. 1976, Communications of the ACM, vol. 19, No. 2, pp. 73–83.*
Jiang, Xiaoyi et al., Edge Detection in Range Images Based on Scan Line Approximation, Computer Vision and Image Understanding, vol. 73, No. 2, Feb., pp. 183–199, 1999.

* cited by examiner

Primary Examiner—Phu K. Nguyen
(74) Attorney, Agent, or Firm—Staas & Halsey LLP

(57) ABSTRACT

An apparatus and a method for detecting an edge of a three-dimensional image. A scan-line approximation unit creates an approximated quadratic curve with regard to each scan-line corresponding to each surface of the three-dimensional image by scanning the three-dimensional image in several directions of a row, a column and both diagonal lines. A curvature value calculation unit calculates approximated curvature values with regard to each division point regarded as different surfaces of the three-dimensional image on the quadratic curve. An edge decision unit decides an edge by comparing the calculated curvature values of the division points with a threshold. According to the above apparatus and the method for detecting the edge of the three-dimensional image, both a jump edge and a crease edge can be detected through one threshold. The method of detecting the edge can detect all edges according to the characteristic of the object of the three-dimensional image by using one threshold, thus the edge can be quickly and more accurately detected. Furthermore, the capability of the entire system can be improved by using information gained during the process of detecting the edge in a pre-process and a post-process.

20 Claims, 6 Drawing Sheets

APPARATUS AND METHOD FOR DETECTING AN EDGE OF THREE-DIMENSIONAL IMAGE DATA

CROSS-REFERENCE TO RELATED APPLICATIONS

This application claims the benefit of Korean Application No. 2001-64546, filed Oct. 19, 2001, in the Korean Patent Office, the disclosure of which is incorporated herein by reference.

BACKGROUND OF THE INVENTION

1. Field of the Invention

The present invention relates to an apparatus and a method of processing three-dimensional image data, and more particularly, to an apparatus and a method detecting an edge of three-dimensional image data.

2. Description of the Related Art

People perceive objects three-dimensionally. That is because people receive visual information about objects three-dimensionally through a sensory organ like eyes. A three-dimensional image process system has been developed for various fields for perceiving objects three-dimensionally as humans perceive objects using their eyes, and for displaying, as three-dimensional images for a user. For example, many problems have been solved by using a three-dimensional image process system in both medical and virtual reality fields.

For modeling three-dimensional objects in the three-dimensional image process system, efficiency of the system should be considered since considerable amounts of data are to be processed. Thus, the three-dimensional image process system performs a three-dimensional surface segmentation segmenting the object into meaningful areas through position information and depth information with regard to the three-dimensional image. Here, the meaningful area can be defined as an area having pixels with an equal value with regard to a certain characteristic. The three-dimensional surface segmentation can be realized through various image-processing methods. The most popularly used method is an image processing method grouping the area based on an edge of the three-dimensional image.

A method related to the edge detection of the three-dimensional image is introduced in "Edge detection in range images based on scan line approximation," Computer Vision and Image Understanding. 73(2)/February 1999, pp.183~199 by X. Jiang and H. Bunke.

In the above-mentioned method for edge detection of the three-dimensional image, a jump edge and a crease edge are detected through different processes to divide each object and area in the three-dimensional image. The jump edge has a discontinuous depth value generated when an object is overlapped with another object or a boundary point of a background and the crease edge has a discontinuous surface direction generated at a point where two surfaces different from each other meet.

However, in the conventional three-dimensional image processing method described above, the jump edge and the crease edge are detected through different processes, thus the three-dimensional image process is complicated.

Moreover, sometimes the crease edge is not detected completely, thus over-segmentation or under-segmentation might be performed. In other words, the edge of a two-dimensional intensity image is completely detected as the jump edge having the discontinuous depth value and thus easily detected by the edge detecting method based on a differential operator. However, the crease edge having the continuous depth value and the discontinuous surface direction in the three-dimensional image is not fully detected only by the differential operator.

SUMMARY OF THE INVENTION

The present invention overcomes the above-mentioned problem of the related art. Accordingly, it is the object of the present invention to provide an apparatus and a method detecting an edge of a three-dimensional image capable of detecting a crease edge more accurately without detecting a jump edge and the crease edge separately.

Additional objects and advantages of the invention will be set forth in part in the description which follows and, in part, will be obvious from the description, or may be learned by practice of the invention.

The apparatus for detecting an edge of a three-dimensional image comprises: a scan-line approximation unit creating an approximated quadratic curve with regard to each scan-line corresponding to each surface of the three-dimensional image by scanning the three-dimensional image in a set-up direction; a curvature value calculation unit calculating approximated curvature values with regard to each division point estimated as different surfaces of the three-dimensional image on the quadratic curve approximated from the scan-line approximation unit; and an edge decision unit deciding an edge by comparing the curvature values of the division points calculated from the curvature value calculation unit with a predetermined threshold.

The method of detecting an edge of a three-dimensional image comprises: creating an approximated quadratic curve with regard to each scan-line corresponding to each surface of the three-dimensional image by scanning the three-dimensional image in a set-up direction; calculating approximated curvature values with regard to each division point regarded as different surfaces of the three-dimensional image on the quadratic curve approximated from the scan-line approximation unit; and deciding an edge by comparing the curvature values of the division points calculated from the curvature value calculation unit with a predetermined threshold.

According to the apparatus and the method for detecting the edge of the three-dimensional image, the edge of each characteristic can be detected more accurately with a simpler process without detecting the edge separately for the jump edge and the crease edge.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
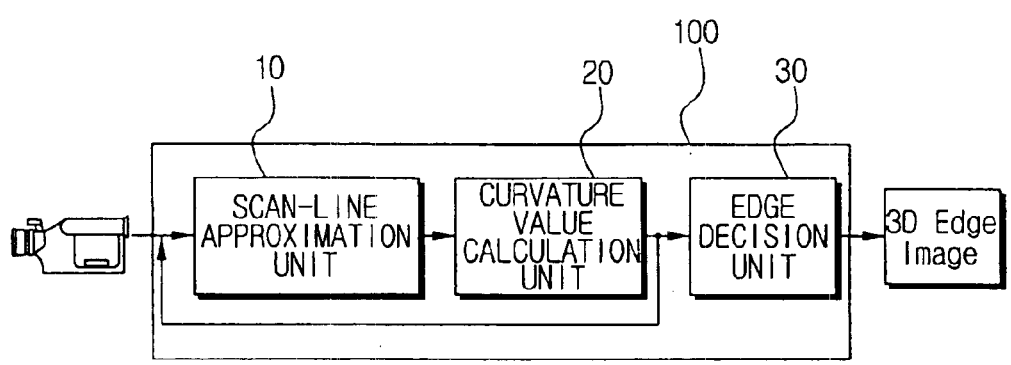
FIG. 1 is a block diagram showing an apparatus for detecting an edge according to an embodiment of the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram schematically showing an apparatus for detecting an edge of a three-dimensional image according to an embodiment of the present invention. The edge detecting apparatus 100 includes a scan-line approximation unit 10, a curvature value calculation unit 20, and an edge decision unit 30.

The scan-line approximation unit 10 scans an input of a three-dimensional image and approximates the three-dimensional image as a quadratic curve. The scan-line approximation unit 10 performs scanning with regard to each direction of a row, a column, and both diagonal lines. In addition, the scan-line approximation unit 10 creates separate quadratic curves according to each scanning. The scanning with regard to the above directions can be performed in parallel to improve the speed of the process, or the scanning can be performed consecutively to detect a more accurate edge point by referring to curvature values of edge candidate points according to the scanning directions.

The curvature value calculation unit 20 calculates approximated curvature values with regard to a plurality of division points estimated as different surfaces in the three-dimensional image from the quadratic curves created by the scan-line approximation unit 10.

The edge decision unit 30 decides an edge by comparing the curvature values calculated by the curvature value calculation unit 20 with a threshold.

Hereinbelow, the operation of the edge detecting apparatus 100 will be described. First, the scan-line approximation unit 10 performs the scan-line approximation in four directions of the row, the column, and both diagonal lines. Each of the scan lines respectively corresponds to curves on a surface of the three-dimensional image. Generally, surfaces different from each other on one scan-line can be approximated with an equation of each curve. Therefore, the quadratic curve approximated in the scan-line approximation unit 10 with regard to an inputted three-dimensional image can be divided into several segments. The division points shown through the segments are the edge candidate points estimated as the edge. Other points in the same area are not considered, since the division points are estimated as the edge.

Figure 2A:
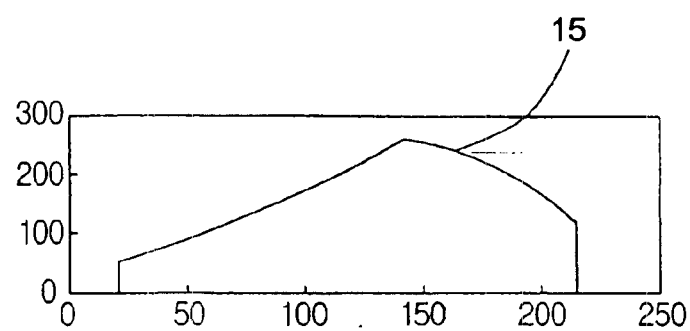
FIGS. 2A and 2B are views, respectively, showing a quadratic curve gained through scanning with regard to a three-dimensional image in a scan line approximation unit of FIG. 1 and division points of the quadratic curve.
Figure 2B:
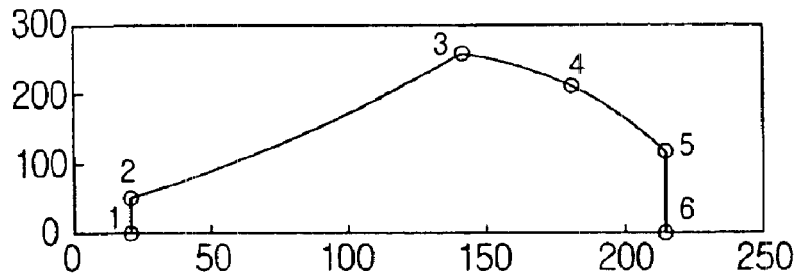

FIG. 2A is one example of a quadratic curve 15 approximated through the scanning in one direction with regard to the input of the three-dimensional image in the scan-line approximation unit 10. The quadratic curve 15 shows a real depth value with respect to the three-dimensional image. FIG. 2B shows the division points on the quadratic curve 15 of FIG. 2A. There are boundary points 1, 2, 5 and 6 on the image representing the objects, a boundary point 3 of a plain surface and a curved surface, and a further edge candidate point 4 on the curve of FIG. 2B.

Figure 3A:
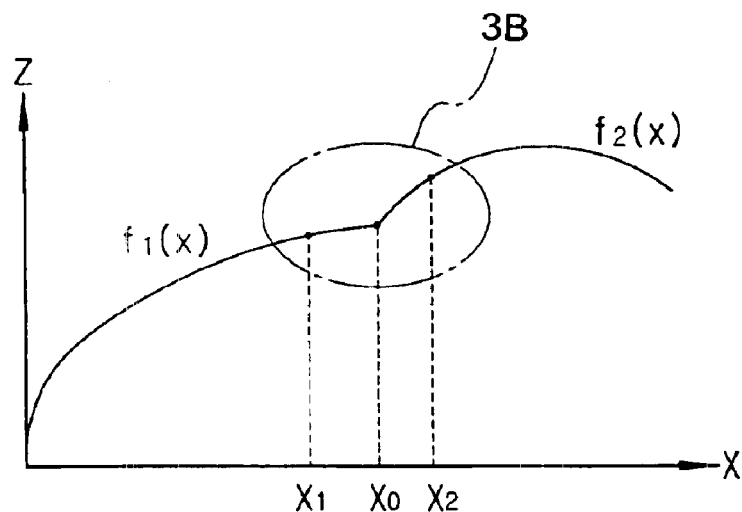
FIG. 3A is a view showing a process of curvature value calculation of the division points of FIG. 2B.
Figure 3B:
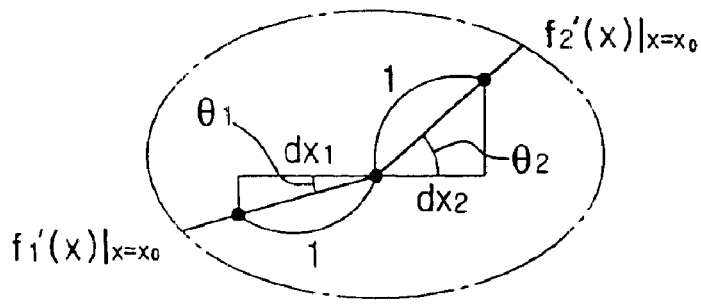
FIG. 3B is a view describing a process of curvature value calculation of a jump edge.

The curvature value calculation unit 20 calculates each of the curvature values with regard to the edge candidate points 1–6. The process of curvature value calculation with respect to each of the division points will be described referring to FIGS. 3A and 3B. It is supposed that the curve is approximated as $f_1(x)$ and $f_2(x)$ on the basis of a division point of $x_0$. Since the three-dimensional image data is approximated as a quadratic curve and the three-dimensional image data is not a discrete value, a desired tangent angle can be easily calculated by using a differentiation value of each function. When it is supposed that each of the curves within a short distance is a straight line, the tangent angle can be expressed as follows.

$$\theta_1 = \tan^{-1}(f_1'(x_0)),$$
$$\theta_2 = \tan^{-1}(f_2'(x_0))$$  [Mathematical Expression 1]

Here, $\theta_1$ is the tangent angle of $f_1(x)$ at $x_0$, and $\theta_2$ is the tangent angle of $f_2(x)$ at $x_0$. Moreover, the distance of $x_1$ and $x_2$ separated as much as the length of a unit arc is calculated to obtain the curvature value at the division point $x_0$. The distances from $x_0$ to $x_1$ and $x_0$ to $x_2$ are the same as $dx_1$ and $dx_2$ in FIG. 3B, thus when $x_1$ and $x_2$ are calculated through the mathematical expression 1, mathematical expression 2 follows:

$$dx_1 = \cos(\theta_1)$$
$$dx_2 = \cos(\theta_2)$$
$$x_1 = x_0 - dx_1$$
$$x_2 = x_0 + dx_2.$$  [Mathematical expression 2]

Therefore, the curvature value at the division point $x_0$ is calculated as an alteration rate of a slope of $x_1$ and $x_2$ gained through the above mathematical expression 2. In other words, the curvature value at $x_0$ can be expressed as the mathematical expression 3 with regard to the length S of the arc and the tangent angle $\theta$ as follows:

$$k|_{x=x_0} = \frac{d\theta}{dS|_{x=x_0}} = \frac{\tan^{-1}(f_2'(x_2)) - \tan^{-1}(f_1'(x_1))}{2}$$  [Mathematical expression 3]

where k is a curvature value; $x_0$ is a division point on a quadratic curve; $x_1$ is a point placed at left as much as a length of a unit arc from the $x_0$ point on a quadratic curve; $x_2$ is a point placed at right as much as a length of a unit arc from the $x_0$ point on a quadratic curve; $\theta$ is a tangent angle of lines of two functions forming the division point; and S is a length of an arc.

Figure 3C:
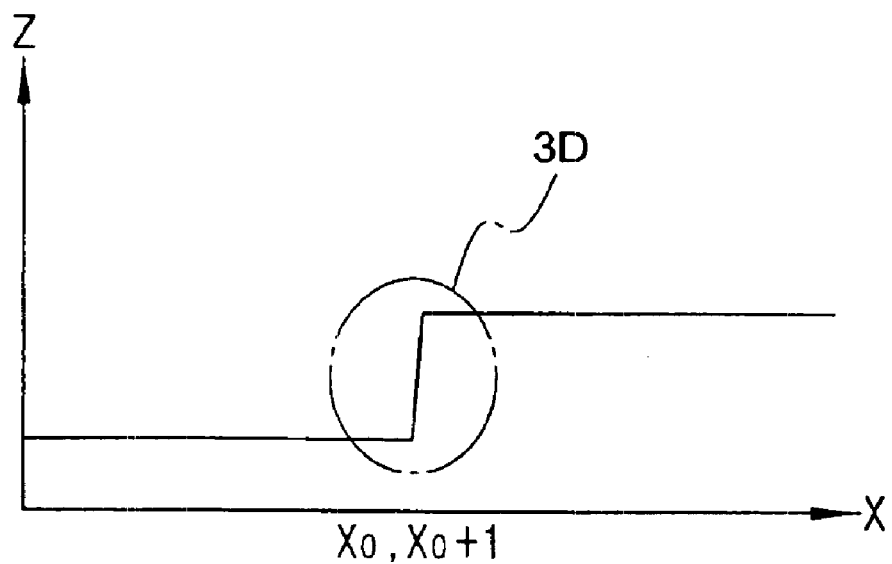
FIGS. 3C and 3D are views showing examples of the jump edge.
Figure 3D:
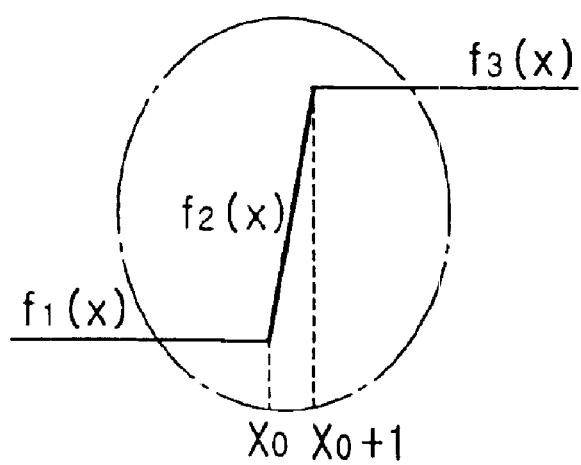

In the meantime, FIGS. 3C and 3D are views showing examples of a jump edge.

Even though $f_1(x)$ and $f_3(x)$ are approximated as the same slope or 0, $f_1(x)$ and $f_3(x)$ are approximated as $f_2(x)$ having a large slope in sectors of $x_0$ and $x_0+1$ having a longer arc than 1 where the jump edge occurred. Therefore, a concave edge and a convex edge are detected at the division points of $x_0$ and $x_0+1$ through the process of the mathematical expressions 1, 2 and 3. In other words, the points $x_0$ and $x_0+1$ are respectively different edges of a concave surface and a convex surface.

Figure 4:
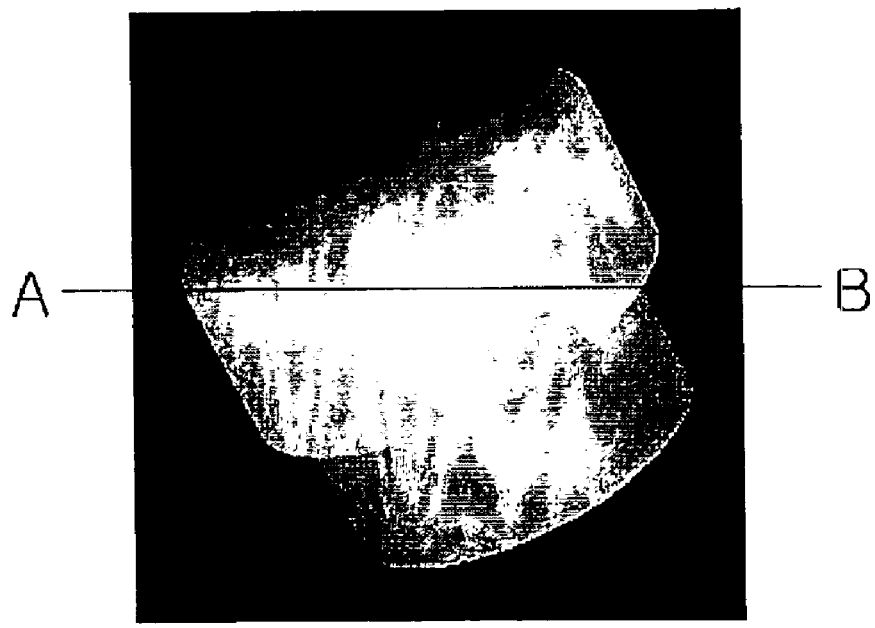
FIG. 4 is a view showing a three-dimensional compound image.
Figure 5A:
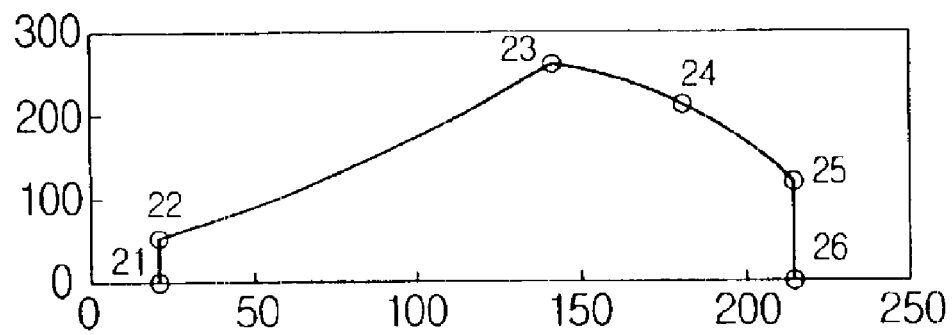
FIGS. 5A and 5B are views respectively showing division points gained through the scan line approximation between A and B in the three-dimensional image of FIG. 4 and a curvature value calculation result with regard to each of the division points.
Figure 5B:
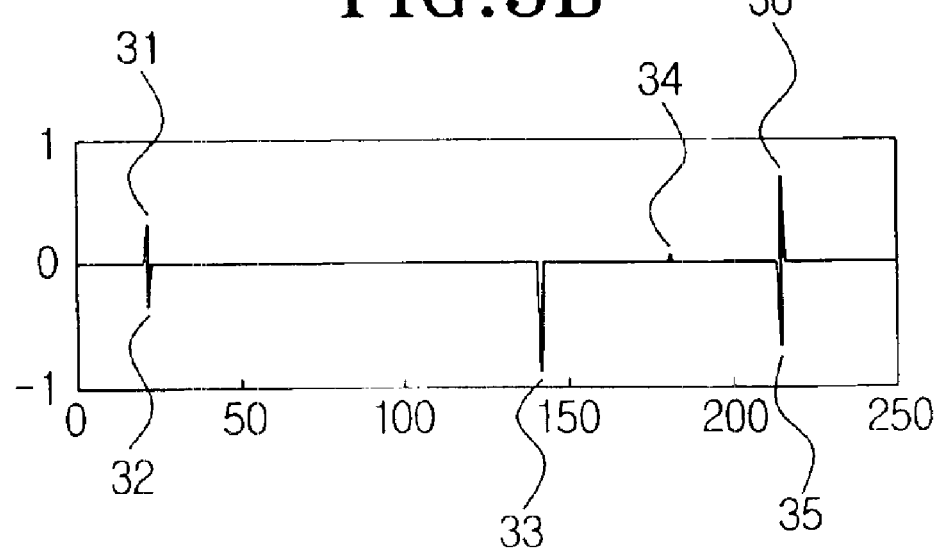
Figure 6:
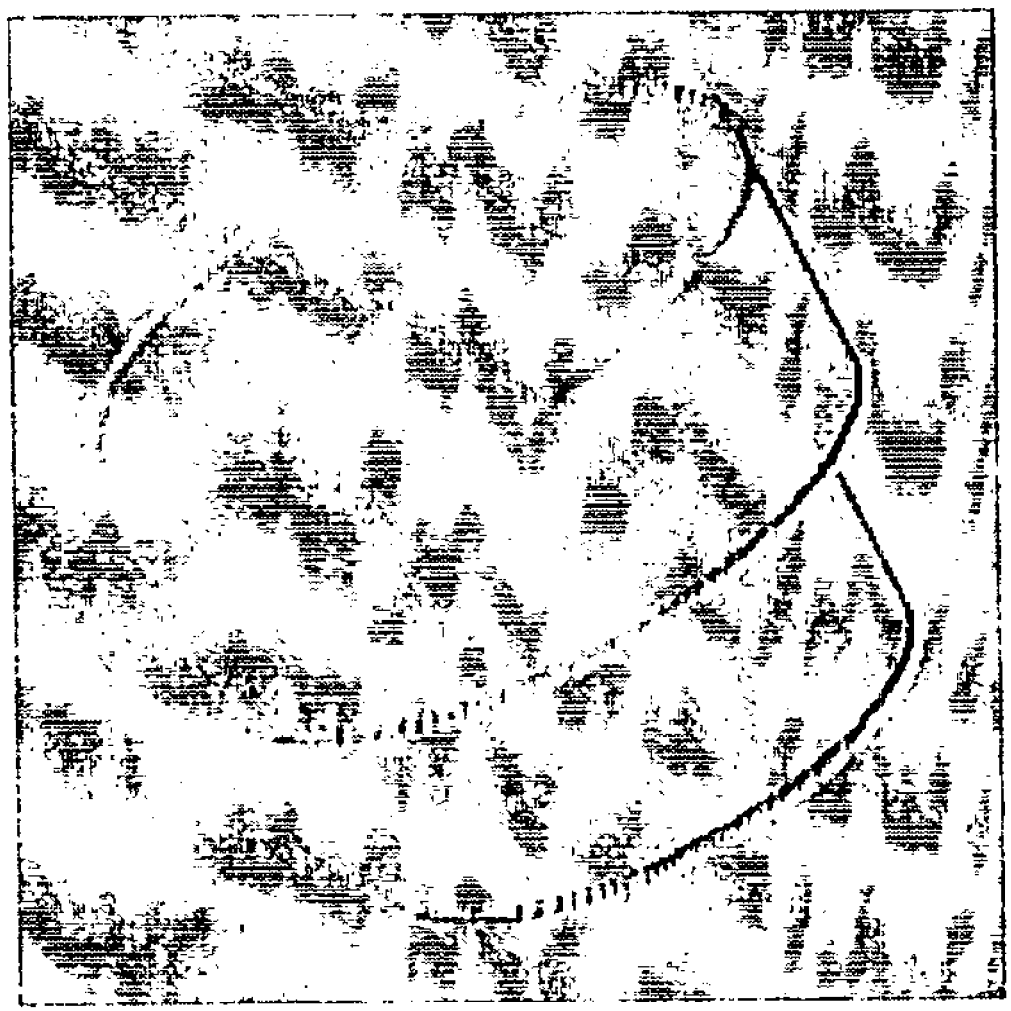
FIG. 6 is a view showing a screen display according to row direction curvature values with regard to the three-dimensional image of FIG. 4.

FIGS. 5A and 5B are views, respectively, showing the division points 21–26 gained through the scan line approximation between A and B in the three-dimensional image of FIG. 4 and the curvature value calculation result with regard to each of the division points. In FIG. 5B, each of the curvature values 31–36, corresponding to a division point 21–26, is shown with relatively large values for both of the jump edge and the crease edge. On the other hand, the inaccurate edge candidate point 24 is shown as a value close to 0. FIG. 6 is a view showing the screen display according to the row direction curvature values with regard to the three-dimensional image of FIG. 4. In FIG. 6, the background is a value of 0, the white area is a value of +, and the black area is a value of −. In other words, the black area is the convex edge, and the white area is the concave edge. Consequently, the jump edge and the crease edge are detected at the same time through the curvature values in FIG. 6. Moreover, since the magnitudes of the curvature values with regard to one point for each direction are different, the direction of the edge can be determined as well.

A maximum value of discontinuity caused by the surfaces of the three-dimensional image may not be shown in one direction of the scan-line. Since the curvature values are different according to each of the directions, the curvature values are calculated for several directions, and the edge is decided through the curvature values in four directions by using an appropriate threshold in a block where the edge is decided.

According to the above apparatus and the method for detecting the edge of the three-dimensional image, both the jump edge and the crease edge can be detected through one threshold. Therefore, the surface segmentation necessary for modeling the three-dimensional object can be effectively performed since the edge can be quickly and more accurately detected.

Furthermore, the capability of the entire system can be improved by using information in a pre-process and a post-process. The information is about the edge direction and the edge types (concave or convex) gained from the characteristic of the curvature.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus for detecting an edge in a three-dimensional image, comprising:
    a scan-line approximation unit creating an approximated quadratic curve with regard to each scan-line corresponding to each surface of the three-dimensional image by scanning the three-dimensional image in a set-up direction;
    a curvature value calculation unit calculating approximated curvature values with regard to each division point estimated as different surfaces of the three-dimensional image on the quadratic curve approximated from the scan-line approximation unit; and
    an edge decision unit deciding an edge by comparing the approximated curvature values of the division points calculated from the curvature value calculation unit with a predetermined threshold, wherein the curvature calculation unit calculates the curvature values of the division points through a mathematical expression represented by;

$$k|_{x=x_0} = \frac{d\theta}{dS|_{x=x_0}} = \frac{\tan^{-1}(f_2'(x_2)) - \tan^{-1}(f_1'(x_1))}{2}$$

where k is a curvature value, $x_0$ is a division point on a quadratic curve, $x_1$ is a point placed at left as much as a length of a unit arc from the $x_0$ point on a quadratic curve, $x_2$ is a point placed at right as much as a length of a unit arc from the $x_0$ point on a quadratic curve, $\theta$ is a tangent angle of lines of two functions forming the division point, and S is a length of an arc.

2. The apparatus according to claim 1, wherein scans of the scan-line approximation unit are performed in a plurality of directions.

3. The apparatus according to claim 2, wherein the scans of the scan-line approximation unit are performed in parallel.

4. The apparatus according to claim 1, wherein scan directions of the scan-line approximation unit are at least one of a row direction, a column direction, and a diagonal direction.

5. A method of detecting an edge of a three-dimensional image, comprising:
    creating an approximated quadratic curve with regard to each scan-line corresponding to each surface of the three-dimensional image by scanning the three-dimensional image in a set-up direction;
    calculating approximated curvature values with regard to each division point regarded as different surfaces of the three-dimensional image on the approximated quadratic curve; and
    deciding an edge by comparing the curvature values of the division points with a predetermined threshold, wherein
    the curvature values of the division points are calculated by a mathematical expression;

$$k|_{x=x_0} = \frac{d\theta}{dS|_{x=x_0}} = \frac{\tan^{-1}(f_2'(x_2)) - \tan^{-1}(f_1'(x_1))}{2}$$

where k is a curvature value, $x_0$ is a division point on a quadratic curve, $x_1$ is a point placed at left as much as a length of a unit arc from the $x_0$ point on a quadratic curve, $x_2$ is a point placed at right as much as a length of a unit arc from the $x_0$ point on a quadratic curve, $\theta$ is a tangent angle of lines of two functions forming the division point and S is a length of an arc.

6. The method according to claim 5, further comprising: scanning in a plurality of directions.

7. The method according to claim 5, further comprising: scanning in at least one of a row direction, a column direction, and a diagonal direction.

8. The method according to claim 7, wherein said scanning of more than one direction is provided in parallel.

9. An apparatus for detecting an edge in a three-dimensional image, comprising:
    a determination unit which determines division points estimated as separating different surfaces of the three-dimensional image based on a curve generated by scanning the three dimensional image in a first direction and calculates approximated curvature values for each division point based on respective arc directions along the curve immediately before and immediately after a respective division point; and an edge decision unit which decides an edge by comparing the approximated curvature values of the determined division points with a predetermined threshold.

10. The apparatus according to claim 9, wherein:
the determining unit determines division points for scans in each of a plurality of directions; and
the edge decision unit determines the edge in each of the plurality of directions.

11. The apparatus according to claim 10, wherein the determining unit determines the division points and the edges in each of the plurality of directions in parallel.

12. The apparatus according to claim 9, wherein the determining unit determines the division points for scans in at least one of a row direction, a column direction, and a diagonal direction.

13. The apparatus according to claim 9, wherein the determination unit calculates the curvature values of the division points through a mathematical expression represented by;

$$k|_{x=x_0} = \frac{d\theta}{dS|_{x=x_0}} = \frac{\tan^{-1}(f_2'(x_2)) - \tan^{-1}(f_1'(x_1))}{2}$$

where k is a curvature value, $x_0$ is a division point on a quadratic curve, $x_1$ is a point placed at left as much as a length of a unit arc from the $x_0$ point on a quadratic curve, $x_2$ is a point placed at right as much as a length of a unit arc from the $x_0$ point on a quadratic curve, $\theta$ is a tangent angle of lines of two functions forming the division point, and S is a length of an arc.

14. A method of detecting an edge in a three-dimensional image, the method comprising:
determining division points estimated as an intersection of different surfaces of the three-dimensional image based on a curve obtained by scanning the three-dimensional image scanned in a first direction;
calculating approximated curvature values at each determined division point based on respective tangents of the curve incrementally before and incrementally after a respective division point; and
deciding an edge by comparing the approximated curvature values of the determined division points with a predetermined threshold.

15. The method according to claim 14, further comprising:
scanning the three dimensional image in each of a plurality of directions;
determining the division points in each of the plurality of directions;
calculating the approximated curvature values in each of the plurality of directions; and
deciding the edge in each of the plurality of directions.

16. The method according to claim 14, further comprising:
scanning the three dimensional image in more than one of a row direction, a column direction, and a diagonal direction;
determining the division points in each scanned direction;
calculating the approximated curvature values in each scanned direction; and
deciding the edge in each scanned direction.

17. The method according to claim 16, wherein the scanning of the more than one direction is provided in parallel.

18. The method according to claim 14, wherein the curvature values of the division points are calculated by a mathematical expression;

$$k|_{x=x_0} = \frac{d\theta}{dS|_{x=x_0}} = \frac{\tan^{-1}(f_2'(x_2)) - \tan^{-1}(f_1'(x_1))}{2}$$

where k is a curvature value, $x_0$ is a division point on the curve, $x_1$ is a point placed at left as much as a length of a unit arc from the $x_0$ point on the curve, $x_2$ is a point placed at right as much as a length of a unit arc from the $x_0$ point on the curve, $\theta$ is a tangent angle of lines of two functions forming the division point; and S is a length of an arc.

19. An apparatus for detecting both jump edges and crease edges in a three-dimensional image by determination of each of the jump edges and each of the crease edges as one of a plurality of division points of different surfaces of the three-dimensional image by scanning in a first direction and calculating approximated curvature values, the apparatus comprising:

a determination unit determining each of the jump edges and each of the crease edges as one of the plurality of the division points, the division points representing transitions of the different surfaces of the three-dimensional image based on a curve according to each scan-line corresponding to a surface of the three-dimensional image scanned in the first direction and calculating the approximated curvature values at each division point based on respective arc directions of the curve at a predetermined increment before and a predetermined increment after a respective division point; and an edge decision unit deciding each of the jump edges and each of the crease edges by comparing the approximated curvature values of the determined division points with one threshold value.

20. A method of detecting both jump edges and crease edges in a three-dimensional image by determination of each of the jump edges and each of the crease edges as one of a plurality of division points of different surfaces of the three-dimensional image, the method comprising:

determining each of the jump edges and each of the crease edges as one of the plurality of the division points representing transitions of the different surfaces of the three-dimensional image based on a curve according to each scan-line corresponding to a surface of the three-dimensional image scanned in a first direction;

calculating approximated curvature values from each determined division point; and deciding each of the jump edges and each of the crease edges by comparing the approximated curvature values of the determined division points with one threshold value.

* * * * *